3,394,126
N,N'-POLYTHIO POLYMETHYLENIMINES
John J. D'Amico, Dunbar, W. Va., assignor to Monsanto
Company, St. Louis, Mo., a corporation of Delaware
No Drawing. Filed Jan. 6, 1966, Ser. No. 519,019
4 Claims. (Cl. 260—239)

ABSTRACT OF THE DISCLOSURE

New compounds of the formula

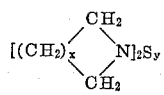

where $x$ is at least 4 but less than 7, and $y$ is at least 2 but less than 5, are vulcanizing agents and accelerators for rubber.

---

The present invention relates to N,N' polythio polymethylenimines. The new compounds may be represented by the general formula

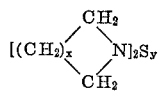

where $x$ is an integer at least 4 but less than 7 and $y$ is an integer at least 2 but less than 5. The compounds form from reaction of sulfur chloride, $S_2Cl_2$, on the polymethylenimine. Heating the resulting products with sulfur serves to incorporate more sulfur in the molecule. They are exceedingly active vulcanizing agents for rubber. Dithioamines heretofore available for vulcanizing rubber have been characterized by long induction periods and relatively low cross-linking efficiency. The new sulfides exhibit essentially no induction period and are characterized by high cross-linking efficiency.

The following examples illustrate in detail the preparation and properties of the new products.

Example 1

To a stirred solution comprising 160 grams (1.6 mole) of hexamethylenimine and 600 ml. of ethyl ether was added dropwise below the surface, over a period of one hour at 0°–10° C., 54 grams (0.4 mole) of sulfur chloride in 100 ml. of ether. After stirring at 0°–10° C. for three hours, 350 ml. of water were added and stirring continued at 10°–20° C. for 15 minutes. The small amount of solid was removed by filtration and discarded. The ether solution was washed with water until the washings were neutral to litmus and dried over sodium sulfate. Ether was removed in vacuo at a maximum temperature of 30° C./1–2 mm. and the product air-dried on a porous plate. 1,1'-dithiodihexamethylenimine was obtained in 76.6% yield as a tan solid. After recrystallization from ethyl alcohol, it melted at 56°–57° C. Analysis gave 10.07% nitrogen and 24.45% sulfur compared to 10.76% nitrogen and 24.62% sulfur calculated for $C_{12}H_{24}N_2S_2$.

Example 2

To a stirred solution comprising 113.2 grams (1.0 mole) of heptamethylenimine and 400 ml. of ethyl ether was added dropwise, over a period of one hour at 0°–10° C., 33.8 grams (0.25 mole) of sulfur chloride in 100 ml. of ethyl ether. Then at this same temperature range 80 grams (0.5 mole) of 25% sodium hydroxide was added over a period of 15 minutes followed by the addition, concurrently, of 33.8 grams (0.25 mole) of sulfur chloride in 100 ml. of ethyl ether and 80 grams (0.5 mole) of 25% sodium hydroxide. After addition was complete, the reaction mixture was stirred at 0°–10° C. for 30 minutes, 250 ml. of water added, and stirring continued for 15 minutes. The ether layer was washed with water until the washings were neutral to litmus and dried over sodium sulfate. Ether was removed in vacuo at a maximum temperature of 30° C./1–2 mm. 1,1'-dithiodiheptamethylenimine was obtained in 91% yield as an amber liquid. Analysis gave 9.42% nitrogen compared to 9.71% nitrogen calculated for $C_{14}H_{28}N_2S_2$.

Example 3

In the procedure of Example 2 an equimolar proportion of actamethylenimine was substituted for the heptamethylenimine. 1,1'-dithiodioctamethylenimine was obtained in 92.2% yield as a yellow solid. After recrystallization from alcohol it melted at 49°–50° C. Analysis gave 8.72% nitrogen compared to the calculated value for $C_{16}H_{32}N_2S_2$ of 8.85%.

These compounds are useful both as vulcanizing agents and as accelerators for vulcanization of rubber. As illustrative of vulcanizing activity, stocks were compounded comprising:

|  | Stock | |
|---|---|---|
|  | A | B |
|  | Parts by Weight | |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| 1,1'-dithiodihexomethylenimine | 3 | 3 |
| 2,2'-dithiobis(benzothiazole) |  | 0.5 |

The stocks were vulcanized by heating for different periods of time in the usual manner in a press at 144° C. The modulus and tensile properties of the 60-minute cures are recorded below:

|  | Stock | |
|---|---|---|
|  | A | B |
| Modulus of elasticity in lbs./in.² at 300 elongation | 1,790 | 2,190 |
| Tensile at break in lbs./in.² | 3,500 | 3,800 |
| Ultimate elongation, percent | 480 | 470 |

Replacing the 1,1'-dithiodihexamethylenimine in Stock B with 2.5 parts by weight of sulfur reduced the tensile to 3000 lbs./in.².

Further to demonstrate the efficiency of the products as vulcanizing agents, tests were carried out employing the compounds on an equimolar basis. Stocks were compounds comprising:

|  | Stock | | |
|---|---|---|---|
|  | C | D | E |
|  | Parts by Weight | | |
| Smoked sheet rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| 1,1'-dithiodihexamethylenimine | 3.65 |  |  |
| 1,1'-dithiodiheptamethylenimine |  | 4.04 |  |
| 1,1'-dithiodioctamethylenimine |  |  | 4.32 |

The stocks were vulcanized by heating different periods of time in the usual manner in a press at 144° C. The stocks reached optimum cure in 20 minutes. The modulus and tensile properties of the 20-minute cures are recorded below:

TABLE I

| Stock | Modulus of elasticity in lbs./in.² at 300% Elongation | Tensile at break in lbs./in.² |
|---|---|---|
| A | 2,210 | 3,800 |
| B | 1,760 | 3,500 |
| C | 1,550 | 2,700 |

A similar stock containing 3.25 parts by weight of 1,1'- dithiopentamethylenimine required 2½ times as long or 50 minutes to reach optimum cure.

Although smoked sheet rubber has been selected as illustrative, rubbers in which the products of the present invention are useful include both natural rubber and synthetic rubber. Rubber includes sulfur-vulcanizable diene polymers, preferably those containing a major proportion of diene polymer. Hydrocarbon diene rubbers are preferred but also useful are copolymers of diene hydrocarbons and acrylonitrile. Furthermore, isobutylene copolymerized with a small amount of diene (Butyl rubber) can be used in practice of the invention. Isoprene or butadiene-1,3-copolymers with vinyl monomers copolymerizable therewith, as for example styrene, are illustrative of the preferred diene rubbers. The amount of thioamine added to the rubber will vary widely depending upon the purpose of the compounder. In general, the amounts will fall within the range of 0.1 to 10 parts by weight per hundred parts by weight of rubber.

The new compounds are biologically effective. Complete inhibition of growth was observed at a concentration of 1 part by weight in 1,000 parts by weight of carrier or vehicle of the following organisms: *Staphylococcus aureus, Salmonella typhosa, Aspergillus niger,* and *Pseudomonas aeruginosa.*

It is intended to cover all changes and modifications of the examples of the invention herein chosen for purposes of disclosure which do not constitute departures from the spirit and scope of the invention.

What is claimed is:

1. A compound of the formula

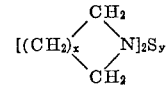

where $x$ is an integer at least 4 but less than 7 and $y$ is an integer at least 2 but less than 5.

2. A compound of claim 1 where $x$ is 4 and $y$ is 2.
3. A compound of claim 1 where $x$ is 5 and $y$ is 2.
4. A compound of claim 1 where $x$ is 6 and $y$ is 2.

References Cited

UNITED STATES PATENTS

| 1,719,920 | 7/1929 | Bedford | 260—239 |
| 2,835,670 | 5/1958 | Hardman | 260—326.84 |

FOREIGN PATENTS

| 969,813 | 7/1958 | Germany. |

ALTON D. ROLLINS, *Primary Examiner.*